United States Patent [19]

Blair

[11] 4,215,518

[45] Aug. 5, 1980

[54] FLANGED CORNER CONSTRUCTION AND METHOD

[75] Inventor: W. Roscoe Blair, Charleston, S.C.

[73] Assignee: Raybestos-Manhattan, Inc., Trumbull, Conn.

[21] Appl. No.: 921,553

[22] Filed: Jul. 3, 1978

[51] Int. Cl.² ............................................. F16L 25/00
[52] U.S. Cl. ........................................ 52/658; 52/746; 52/748; 285/424
[58] Field of Search ................. 285/424, 235; 52/658; 138/155; 52/746, 748

[56] References Cited

U.S. PATENT DOCUMENTS

| 2,039,886 | 5/1936 | Cohn | 285/424 X |
|---|---|---|---|
| 3,195,079 | 7/1965 | Burton et al. | 138/155 X |
| 3,199,901 | 8/1965 | Jeppsson | 285/424 |
| 3,811,714 | 5/1974 | Pintard | 285/424 |
| 3,934,905 | 1/1976 | Lockard | 285/424 |

Primary Examiner—William F. Pate, III
Attorney, Agent, or Firm—Gary, Juettner & Pyle

[57] ABSTRACT

A three dimensional corner fixture for a flexible joint or the like is prepared from a continuous belt or strip of flexible flat material. The strip is partially slitted from an edge, and an insert is secured between the opposed edges of the slit to allow the material to substantially conform to the shape of a flanged corner, preferably with a leg or tab extending from the insert and secured at least through the radius at the corner.

15 Claims, 9 Drawing Figures

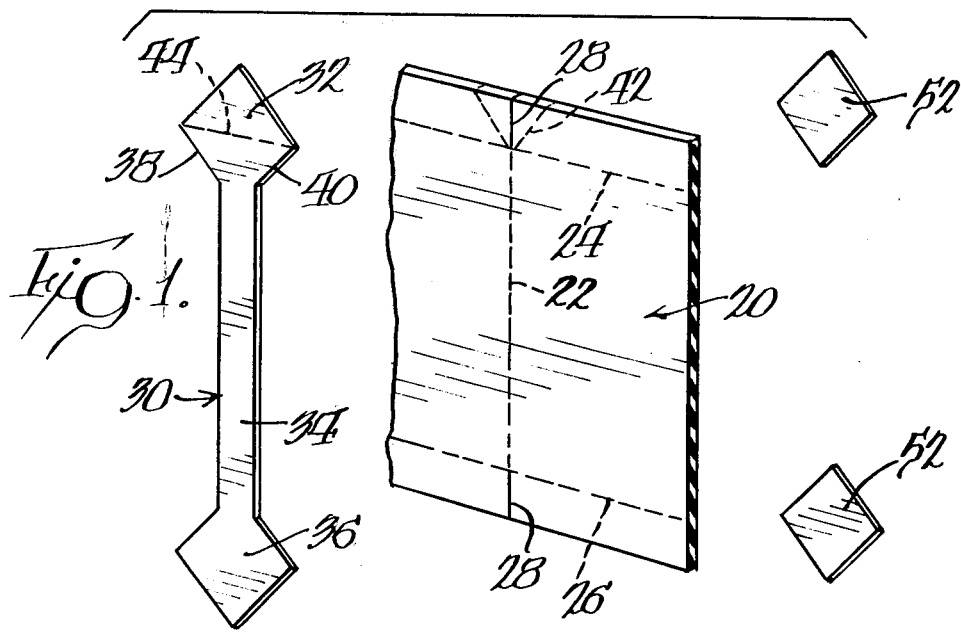
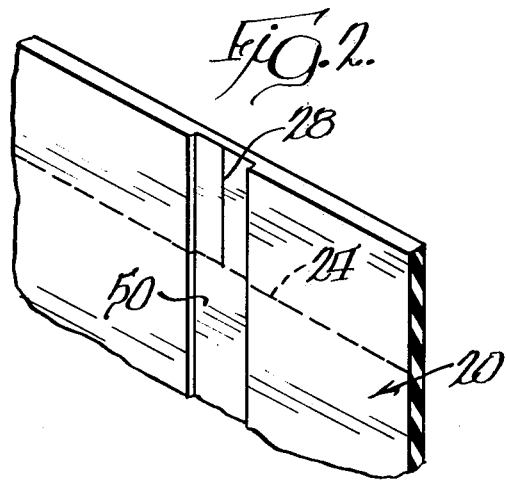
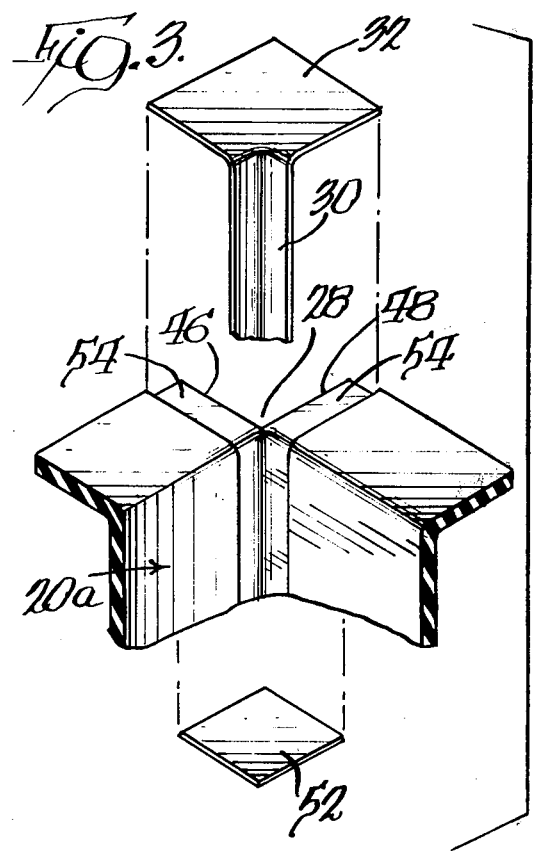
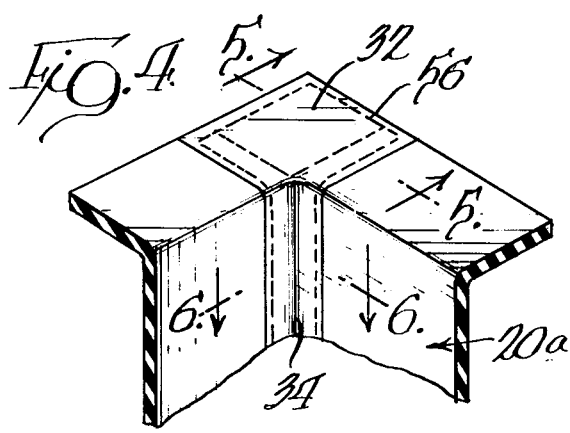

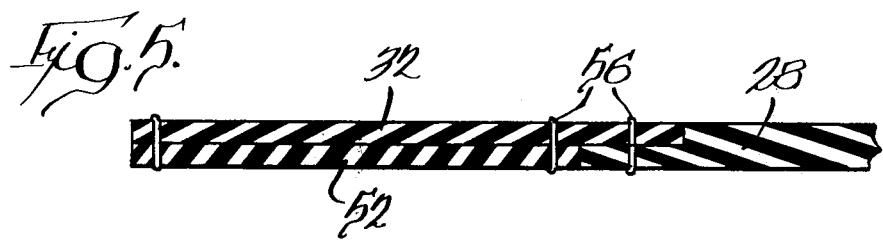
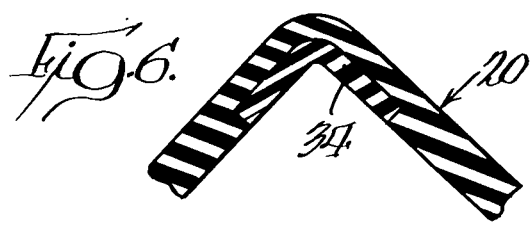
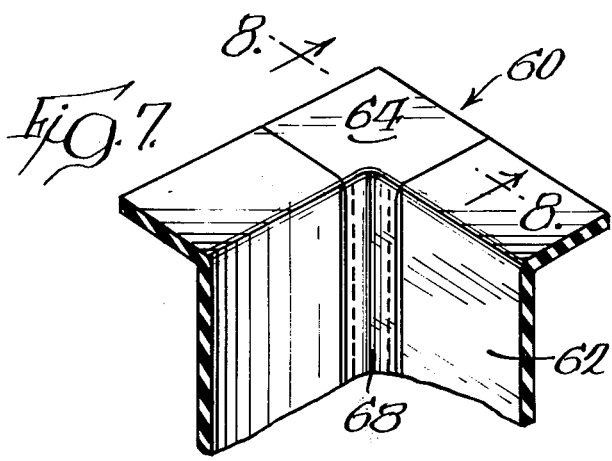
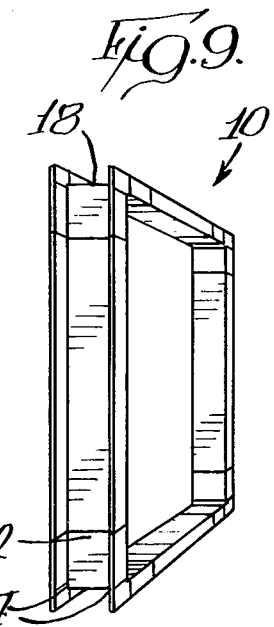
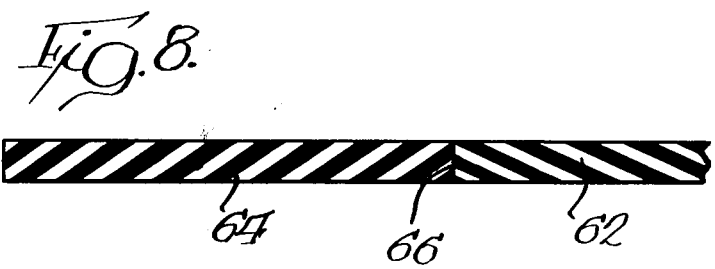

FLANGED CORNER CONSTRUCTION AND METHOD

BACKGROUND OF THE INVENTION

This invention relates to flanged corner constructions made from flexible materials and more particularly to corners for flexible hollow couplings, sometimes referred to as expansion joints.

Hollow flexible joints connect pipes, ducts and the like, and such joints are usually installed to allow limited movement of one part relative to another due to thermal expansion, vibration, misalignments and the like. Expansion joints are typically used to connect gas or air inlet or outlet ducts, such as are found in large drying, exhaust, heating, ventilating and power generating systems. These flexible joints may be quite large and may be made of a continuous length or belt of flexible material having a flange along each edge for connection to corresponding flanges of the ductwork.

If the openings to be connected are cylindrical, it is a relatively simple matter to provide a cylindrical segment of flexible material between the surfaces to be connected. In practice, however, many ducts are rectangular or square in cross section, and this requires that four flanged corners be formed or inserted into the structure of the joint.

Heretofore, the addition of flanged corner structures to expansion joints has been a time consuming and inefficient task. In accordance with the conventional procedure, the corners must be each separately fabricated from a number of pieces of curable material, and a separate curing operation is required. Each corner must then be spliced on each side to the straight portions of the expansion joint, or a total of eight splices for a four corner construction. The corner formation and splicing operations are time consuming and costly and increase the likelihood of imperfections, leaks and weaknesses in the joint.

SUMMARY OF THE INVENTION

The present invention provides a unique solution to the problem of fabricating a corner construction in that no separate fabrication or splicing of the corner fixture is required. Instead, the flanged corner is formed directly into a continuous length or belt of flexible material. The material is first slitted for a specified distance at the top and bottom along a line perpendicular to the length of the material corresponding to the desired location of the corner. The material may be then bent over at the line, and the top and bottom edges may be bent over to expose spaces between adjacent severed edges of the flanges. An insert is then secured within said space to the adjacent edges to complete the corner. The insert preferably has enlarged or diamond shape ends connected to another portion or leg, which is secured in the corner between the flanges. Provision is also made for laminating or securing the insert into place without creation of lumps or imperfections in the flange area, while providing a reliable, leak-proof structure.

DESCRIPTION OF THE DRAWINGS

FIG. 1 is a perspective assembly view illustrating the various parts utilized to fabricate the corner fixture of the present invention.

FIG. 2 is a fragmentary view illustrating modifications made in a length of material prior to inclusion of the insert.

FIG. 3 is a perspective assembly view illustrating application of the inserts to form a flanged corner.

FIG. 4 is a perspective view of the corner as completed from the assembly shown in FIG. 3.

FIG. 5 is a sectional view taken through section line 5—5 of FIG. 4.

FIG. 6 is a sectional view taken along section line 6—6 of FIG. 4.

FIG. 7 is a perspective view of another version of the corner fixture of the present invention.

FIG. 8 is a sectional view taken along line 8—8 of FIG. 7.

FIG. 9 is a perspective view of an expansion joint utilizing the corner fixture of the present invention.

DESCRIPTION OF THE PREFERRED EMBODIMENT

FIG. 9 illustrates a typical expansion joint 10 of the general type herein contemplated. The joint consists of a continuous rectangular or square member composed principally of a strip or belt of flexible material typically composed of cured rubber and fabric. The flexible member has a central, connecting portion 12 and a pair of bent over flanges 14 extending at approximately a right angle from the central portion. The flanges 14 are provided to enable convenient securement of the joint between corresponding flanges of ducts and the like (not shown). The flanges are formed in the portions between the corners by folding over the edges of the strips.

The basic form of the above-described expansion joint 10 is conventional and the uses thereof are well known. It may be seen that the joint typically includes four square corners 18 with the continuous flanges 14 extending around the corners at substantially right angles thereto. Since this portion of the structure is three-dimensional, a two dimensional continuous strip of rubber coated fabric or the like cannot be employed to form the corner. Heretofore, corner structures have been separately formed by laying up a complex arrangement of curable pieces of flexible material around a three-dimensional mold, and then separately curing or vulcanizing the assembly under heat and pressure into a finished corner unit. Four of such units would then be hand-spliced to other strips of material to form the final structure.

FIGS. 1 through 6 illustrate a simplified structure and method of assembly for fabricating a corner directly into a continuous strip of material utilizing only flat or planar pieces of material and without the need for the aforesaid splicing procedures.

As shown in FIG. 1, a single length of a belt or strip 20 of material having preferably parallel edges would normally be used for a four corner structure, and the ends of which would be eventually spliced or otherwise secured together to form a continuous loop. For the sake of brevity, however, only that portion of the strip 20 utilized in the fabrication of a single flanged corner will be described herein in detail.

The material utilized for the strip 20 and the other component parts of the corner structure hereinafter described may be composed of single or multiple-ply flexible sheet material, and in the case of expansion joints, an illustrative material would be a reinforced elastomer strip, such as, but not limited to, fiberous or cloth-like fabric coated with an elastomer or other suitable polymeric material, which may either by pre-cured or curable. The choice of materials, however, is not important to the objectives or results of the present invention, and the flexible material utilized is selected primarily on the basis of desired performance characteristics, with the addition of at least an effective amount of reinforcing materials as required.

While an important objective of the present invention is achieved by the ability to use flat or two-dimensional materials to fabricate a continuous, three-dimensional flanged corner, it will be apparent that the flat pieces described herein could be preformed into three dimensional or angular shapes, and hence the term "flat" as employed herein shall be inclusive of flat pieces that have been preformed.

As shown in FIG. 1, the desired location for the flanged corner is first located on the strip 20, for example, at a fold line 22 perpendicular to and extending between the edges of the strip. The desired width of the flanges are also determined, as shown by the fold lines 24 and 26 located adjacent the respective edges of the strip and substantially parallel thereto.

The corner structure is initiated by making a slit or cut-out 28 from each edge of the strip 20 inwardly substantially along the corner fold line 22, said slit extending approximately to the flap fold line 24 or 26. After the slits have been made, it is possible to bend the strip along the fold lines 22, 24 and 26 in the form of a partially flanged corner construction as shown at 20a in FIG. 1, with the flange portions extending at right angles from the body of the strip and having a V-shaped or other gap 28 between the slit edges thereof created by the bending of the material into the corner shape.

It will be understood that a typical structure will include continuous flanges at both ends of the fold line 22, but for the sake of brevity, the construction of only a single flange around the corner is shown in FIGS. 2-5, it being understood that the opposite side of the strip or belt, if desired, will be formed identically to the one herein described.

The basic combination of materials used to form the corner are the slitted belt or strip 20 and an insert such as shown at 30 in FIG. 1. The insert includes at least one enlarged end 32 of flexible material that is sized to fit into the gap or notch (FIG. 3) when the strip is bent into the partially flanged corner configuration. In the case of a square corner, as shown, the enlarged end piece 32 would be triangular or diamond shape of proper dimension to fill the gap 28 when the basic strip if folded as shown in FIG. 3. Extending from an apex of the enlarged end piece 32 of the insert 30 is an elongated portion, tab or leg 34 that is adapted to be folded over at least the radius or juncture of the corner and preferably secured to or along the interior of the corner fold line 22. A second enlarged end piece 36 may be provided at the other end of the leg 34 to provide an insert for the opposite corner flange.

It will be apparent that the leg 34 may alternatively be positioned on the exterior of the corner fold line 22 if desired. Also, a separate leg may be provided for each of the end pieces 32 and 36, and said leg may be in any desired shape, such as a strip, tapered, or the like.

It will be understood that the shape of the end piece or insert 32 will be determined by a variety of factors, such as the corner angle desired and the radius of curvature at the flange. For a right angle corner and flange, the side edges 38 and 40 of the insert 32 extending from the leg 34 will be at approximately right angles from each other and at about 45 degrees each from the longitudinal center line of the leg 34, which corresponds to corner fold line 22. This angle of divergence can be either increased or decreased to accommodate any desired angle either at the corner (along line 22) or at the flanges (along line 24 and 26), the right angles being shown for illustration purposes only to facilitate understanding of the invention.

It may also be seen that the shape of the end piece 32 may be altered if something other than the slit 28 is utilized, for example a V-shaped notch shown in dotted lines at 42, although essentially any shape notch or slit angle could be utilized. In such cases, the size and shape of the end piece 32 would simply be adjusted for fit into the gap 28 between the severed edges and to provide the desired configuration. Obviously, many variations are possible depending upon the desired application and materials.

In addition, although a diamond-shaped end piece 38 is shown, it would be possible to alter or remove the end of the piece to fill the gap 28. The diamond shape is utilized in those instances where a square or completed flange area is desired at the corner, although other shapes could obviously be utilized.

In order to construct the corner, the slit 28 is opened and the diverging edges 38 and 40 of the insert are secured in abutting or other relation to the severed edges 46 and 48 to fill the gap 28 formed when the slitted strip 20a is bent or folded in the desired configuration. The leg 34 is bent over the corner apex and is secured to the interior or exterior corner of the strip 20a as shown in FIGS. 3 and 4. Upon being secured in position, the insert 30 allows the strip to be bent into the configuration of the flanged corner.

As shown in FIGS. 1-6, the insert may be laminated into the structure by a variety of methods to provide a smooth unbroken surface at the juncture of the insert 30 and strip 20, particularly around the flange corners, thereby facilitating the provision of a seal between the flanges and a mating surface.

As shown in FIG. 2, a groove or delamination 50 may be provided, such as by grinding, from edge to edge of one side of the strip 20. The groove 50 extends laterally on either side of the slit 28 and is wide and deep enough to receive the leg 34 of the insert 30. The insert 30 may be made from less than full thickness material and may be sewn or otherwise secured or laminated in the groove as shown in FIGS. 3 through 6. To complete the structure, smaller pieces of material of suitable size such as 52 may be secured in the gap 28 to the exposed portion sides of the enlarged end 32 to provide a uniform thickness of insert within the gap, whereby the insert is totally laminated in position, as shown in FIGS. 4, 5 and 6. Obviously, the pieces 52 may be pre-secured in position or may be an integral part of the insert 30. In either case, the combined thickness of the pieces 52 and end is substantially the same as the thickness of the material of the strip.

As shown in FIGS. 3-5, the recessed areas 54 in the flanges adjacent to the severed edges 46 and 48 provide overlapping flaps that facilitate reliable and impermeable securement of the enlarged end 32 of the insert 30 in position. As shown, the insert may be easily stitched to the strip along lines 56 or otherwise secured by adhesives, bonding, or the like in the manner shown to complete the structure.

While the groove 50 and slit 28 are shown as being made at right angles relative to the surface of the strip 20, it will be apparent, for example, that the groove 50 could have diverging angles at the sides or a stepped configuration, and a corresponding or complementary abutting surface would be provided on the insert, whereby to increase the effective sealing area and reduce the possibility of leaks.

As shown in FIGS. 7 and 8, the insert 60 need not be laminated to the strip 62 as described in the previous embodiment. The enlarged end 64 may be merely abutted against the severed edges at 66 and welded or secured in a coplanar relationship. The leg 68 may then be simply secured on the interior or exterior surface of the corner as shown. Obviously, many other methods of securing the insert in position could be employed, such as a thin sheet of elastomer over the abutting edges of the strip and inserts.

If desired, a curable adhesive or elastomer may be used on the facing or abutting surfaces of the material, and the structure could thus be permanently fastened by curing of the adhesive or elastomer. Heat and self-curing materials are suitable, and if desired, pressure may be applied together with the curing to cause the structure to set in a more permanent configuration.

An important advantage of the invention is that the materials used in the fabrication of the flanged corner may be pre-cured and may be seamed together with adhesives and the like, thus providing a considerable reduction in production costs over the conventional structure formed of curable pieces and separately vulcanized in a complex mold.

I claim:

1. A corner construction having a flange extending around at least one end of the corner, said corner construction comprising a strip of flexible, essentially flat material having at least one edge, said edge being bent over relative to said strip to define a flange, said strip being bent lengthwise in the form of a corner, a separation in said flange at said corner defining a space in said flange beyond said corner, an insert made of essentially flat flexible material, said insert substantially corresponding to the dimensions of said space at said separation, and means for securing said insert to said flange in said space, said insert having a portion extending around and secured to the juncture at said flange and corner.

2. The corner construction of claim 1 wherein said insert portion is elongated and is secured along said corner in said strip.

3. The corner construction of claim 2 wherein a pair of flanges extend around opposite sides of said corner, said elongated portion having an insert to each end thereof.

4. The corner construction of claim 1 wherein said insert is diamond shaped.

5. The corner construction of claim 1 wherein said insert includes relatively diverging sides secured in said space.

6. The corner construction of claim 1, wherein said insert portion is relatively narrower than said insert.

7. The corner construction of claim 1 wherein said insert is laminated into said corner.

8. The corner construction of claim 2 wherein said strip has a groove therein, said insert portion being received in said groove.

9. The corner construction of claim 1 wherein said insert and strip together define smooth outer surfaces.

10. The corner construction of claim 1 wherein said insert is of the same thickness as said flange.

11. The corner construction of claim 10 wherein said insert portion is lesser in thickness than said insert and strip.

12. The corner construction of claim 1 wherein said flexible material comprises an elastomer.

13. The corner construction of claim 12 wherein said elastomer is reinforced with at least an effective amount of reinforcing material.

14. Method for making a three dimensional flanged corner from planar flexible material, comprising the steps of defining a corner line in a first piece of said material having opposed edges, defining a flange line in said material on an angle to corner line and adjacent to one edge, severing said material from said one edge to approximately the flange line to define opposed severed egdes, and securing a separate insert of planar material between said severed edges.

15. Method for making a three dimensional flanged corner in a belt of flexible planar material having opposed edges comprising the steps of defining a corner line between said edges, defining a flange line substantially parallel and adjacent to one of said edges, severing said material from said one edge substantially to said flange line and substantially along said corner line to define a pair of severed edges, providing an insert in the form of a planar strip having a relatively enlarged end with side surfaces diverging away from the strip, securing said diverging side surfaces of said insert relative to respective edges of said pair of severed edges, and securing the strip onto the corner fold line.

* * * * *